3,439,956
APPARATUS FOR PNEUMATICALLY DISCHARGING COMMINUTED LADING
Orville Ingram and Walter L. Floehr, Toledo, Ohio, assignors, by mesne assignments, to Midland-Ross Corporation, Cleveland, Ohio, a corporation of Ohio
Filed June 20, 1967, Ser. No. 647,514
Int. Cl. B65g 53/40
U.S. Cl. 302—52                              16 Claims

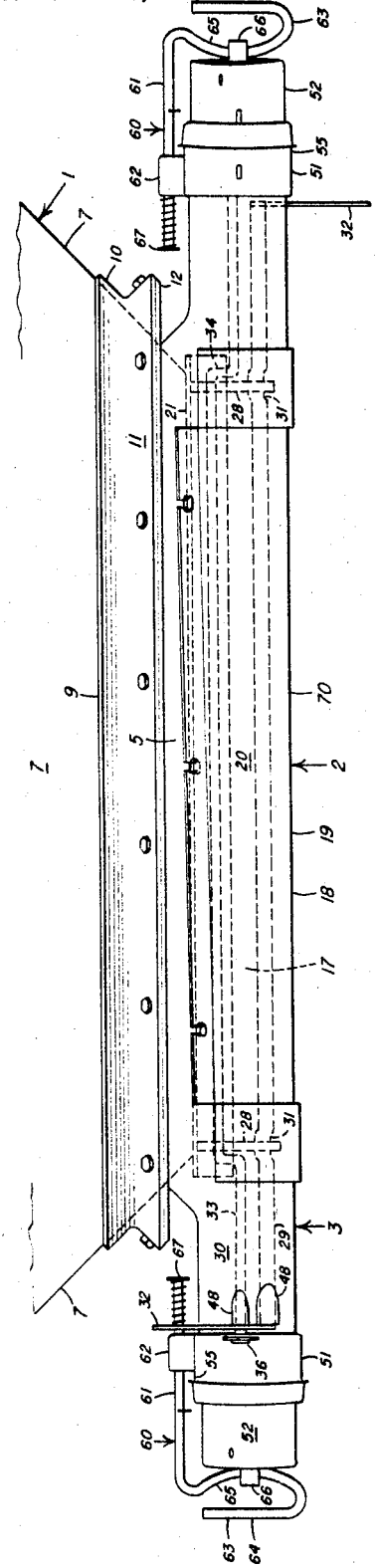

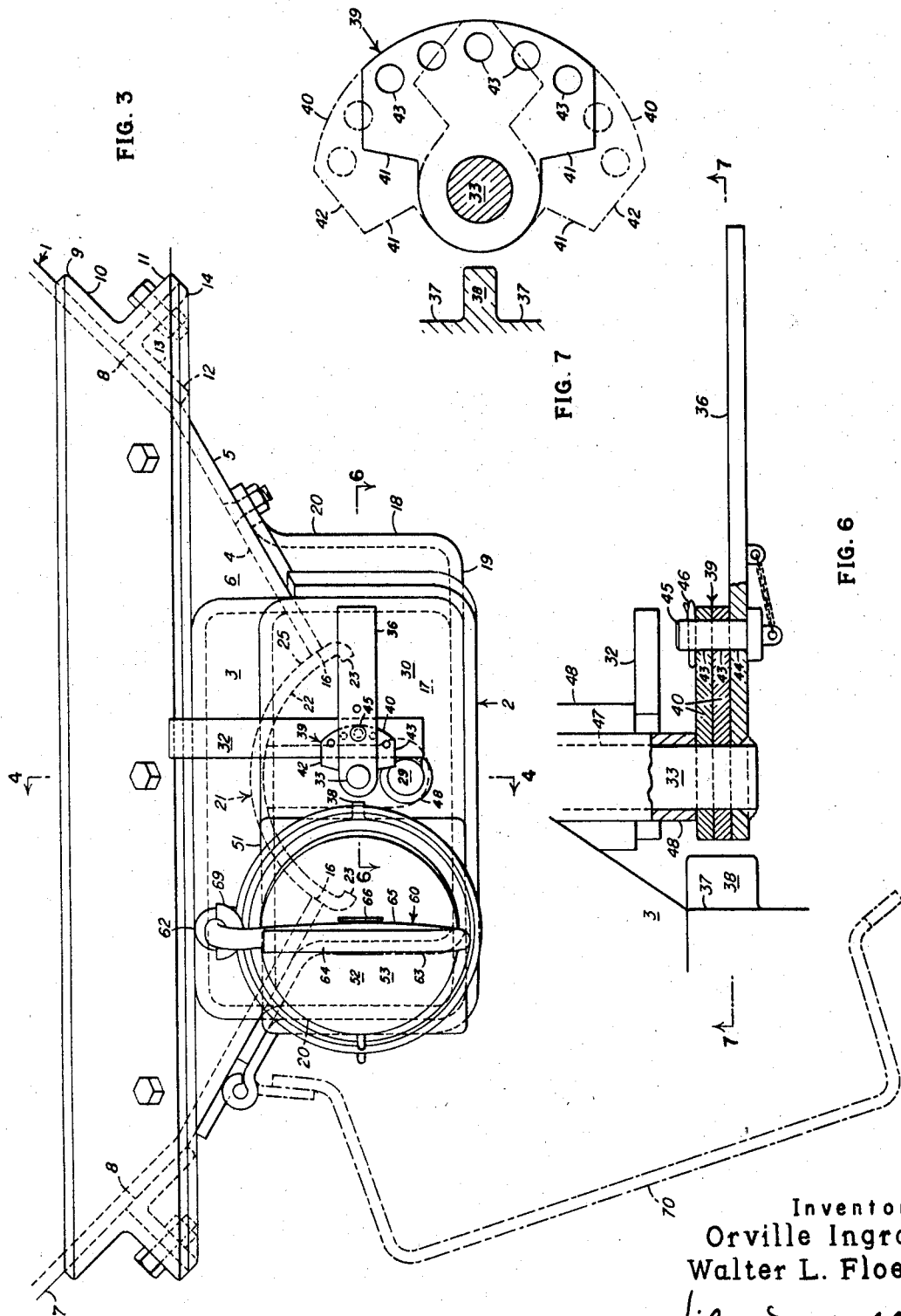

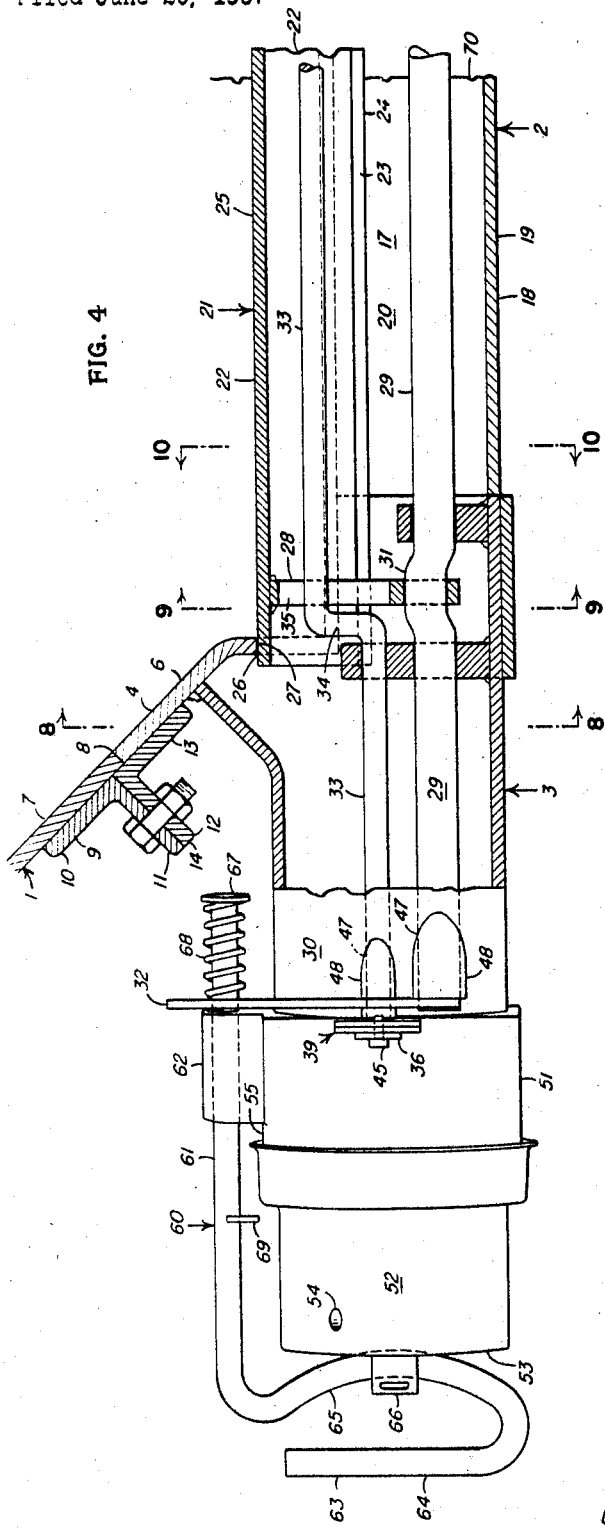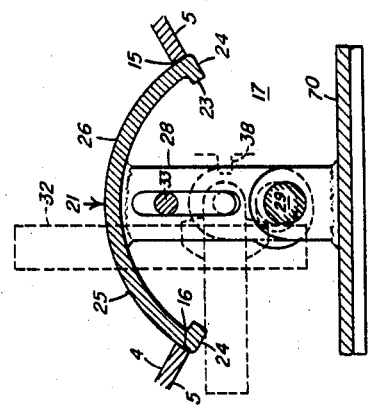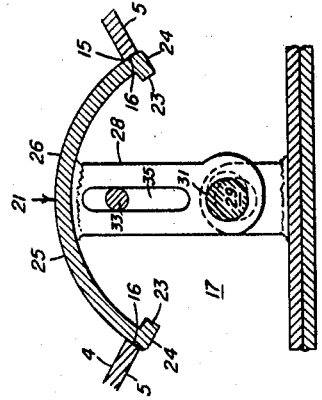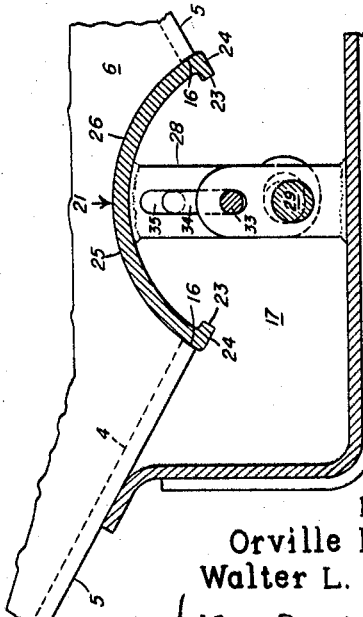
Inventors:
Orville Ingram
Walter L. Floehr
By Wilmer Mecklin
their Attorney Inventors:
Orville Ingram
Walter L. Floehr
By Wilmer Mechlin
their Attorney United States Patent Office 3,439,956
Patented Apr. 22, 1969

ABSTRACT OF THE DISCLOSURE

A pneumatic discharge apparatus for a railway car hopper having a housing containing a mixing chamber into which lading is fed by gravity through a lading inlet for mixing with air flowing under pressure through the chamber, a gate mounted in the housing both for swinging to open and close the inlet and for movement into and out of engagement with a boundary of the inlet for alternately restraining against and permitting its swinging, and a removable section on the housing to permit clean-out of the mixing chamber or gravity discharge of the lading.

Background of the invention

In recent years several types of apparatus have been introduced or proposed for pneumatically discharging comminuted lading of suitable consistency from hopper cars by mixing the lading with air under positive or negative pressure for movement to a suitable collector. These prior types have been of varying complexity, the lading in some being fluidized before it is moved, while in others it is fed by gravity through an inlet into a mixing chamber directly into the stream of air responsible for moving it to the collector. The gravity feed in the latter case must be regulated or metered to suit the particular material and a number of metering devices have been proposed. Each has for metering a valve member movable between open and closed positions and a rotary valve member should provide satisfactory metering. However, in prior devices using rotary valve members freedom of rotation of the valve member has been obtained only at the expense of effective sealing against entry of lading into the mixing chamber during transit, with consequent likelihood of clogging. It is to this problem that the present invention is particularly directed.

Abstract of the invention

The present invention has as its primary object the provision of an improved apparatus for pneumatically discharging comminuted lading from railway car hoppers, which, while having the lading fed by gravity through an inlet into a mixing chamber directly into an air stream and metering the feed by a rotary valve member, has the valve member so mounted as to be able to seal the inlet during transit without interfering with its freedom of rotation for metering during discharge. In the improved apparatus the lading inlet preferably has both straight and parallel sides and a preferably similarly sided gate is so mounted as to be adapted either to seal the inlet by engaging both of the latter's sides or o be moved freely in the inlet to expose an opening of an area suited for the particular lading, as well as to be lockable against movement in any of its positions.

The inlet and gate preferably extend the length of the mixing chamber and the preferred gate presents to the lading through the inlet an arcuately convex face and is both swingable for opening and closing the inlet and shiftable for locking it in selected position against one or both of the inlet's sides or freeing it from those sides for ready oscillation. By mounting the gate in a housing containing the mixing chamber and making part of the housing removable, access for clean-out purposes to the chamber, inlet and gate is readily obtained and such movement also permits the lading to be discharged by gravity through the inlet, should this ever prove desirable.

Provision is made in the preferred apparatus for presetting the area of the opening in the inlet openable by the gate at the time of loading to suit the particular lading and the presetting is adjustable to suit different ladings. Also the air openings in the housing are lockable against unauthorized opening between the loading point and the destination and the apparatus as a whole is adapted to be removably mounted on a hopper so as to permit quick interchange with a conventional gravity discharge gate.

With the foregoing the principal objectives, other objects and advantages of the invention will appear hereinafter in the detailed description, be particularly pointed out in the appended claims and be illustrated in the accompanying drawings, in which:

Figure description

FIGURE 1 is a side elevational view of a preferred embodiment of the improved pneumatic discharge apparatus of the present invention applied to a hopper;

FIGURE 2 is a plan view of the apparatus of FIGURE 1 removed from the hopper;

FIGURE 3 is an end elevational view on an enlarged scale of the structure of FIGURE 1;

FIGURE 4 is a fragmentary view of the structure of FIGURE 3 partly in side elevation and partly in a section taken along lines 4—4 of FIGURE 3;

FIGURE 6 is a fragmentary horizontal sectional view on an enlarged scale taken along lines 6—6 of FIGURE 3;

FIGURE 7 is a fragmentary vertical sectional view taken along lines 7—7 of FIGURE 6;

FIGURE 8 is a fragmentary vertical sectional view taken along lines 8—8 of FIGURE 4;

FIGURE 9 is a fragmentary vertical sectional view taken along lines 9—9 of FIGURE 4;

FIGURE 10 is a fragmentary vertical sectional view taken along lines 10—10 of FIGURE 4, and FIGURES 11, 12 and 13 are views on the section of FIGURE 10 showing different positions of the gate.

Detailed description

Figure 5:
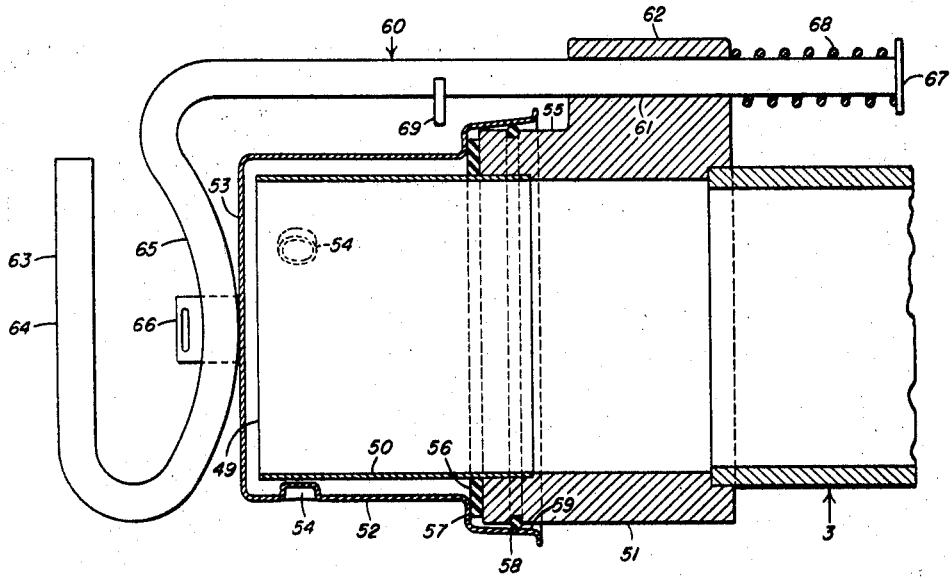
FIGURE 5 is a fragmentary vertical sectional view taken along the same lines 4—4 as FIGURE 4, and on a larger scale.
Figure 11:
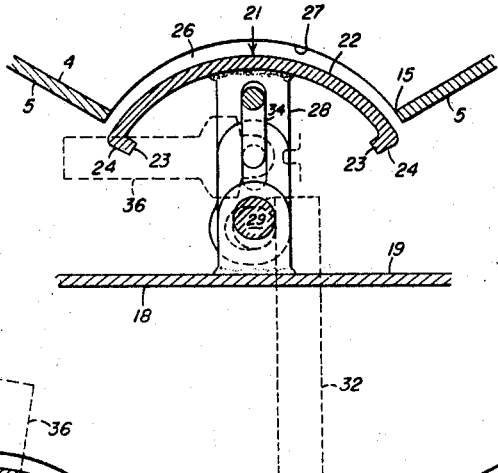
Figure 12:
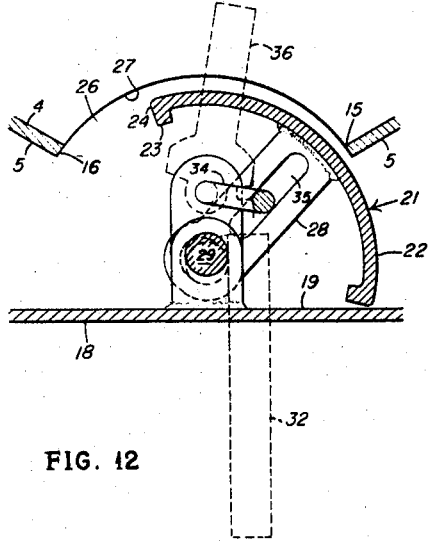
Figure 13:
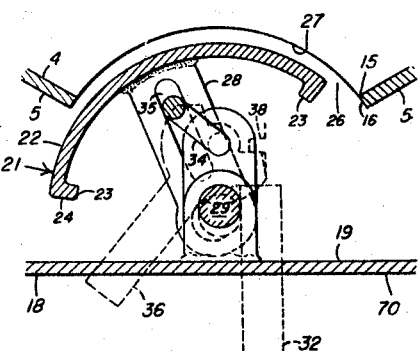

Referring now in detail to the drawings in which like reference characters designate like parts, the improved apparatus of the present invention is designed and particularly adapted for pneumatically discharging from a hopper of a railway hopper car lading or material that is comminuted, finely divided or powdered and otherwise suited to the pneumatic handling of being free-flowing and non-agglomerating. In the improved apparatus the comminuted material is discharged by being fed by gravity into a stream of air flowing under pressure and removed or transported by the air stream from the hopper to a suitable collector, with the rate of discharge controlled by metering the feed. The pressure responsible for the flow of the air may be positive or negative, the latter, with a limit on the practically achievable vacuum or negative pressure of about 12 pounds per square inch, being usable primarily for discharging lower density comminuted materials, such as feeds, fertilizers, phosphates and grains.

Adapted to be mounted on the bottom of a hopper 1 of a hopper car that usually will be of the covered type, the improved pneumatic discharge apparatus 2 is comprised of a frame 3 in the upper part of which is an outwardly opening trough or chute 4 bounded by side walls 5 and end walls 6, each adapted to abut or otherwise engage or contact a bottom end of one of the side and end sheets 7 of the hopper 1. It is through these walls and sheets that the frame and hopper are connected.

In the preferred connection or coupling there is a butt joint 8 between each of the walls 5 and 6 and the adjoining, corresponding or related sheet 7 and the portions of each wall and the adjoining sheet adjacent the joint are of the same slope. An upper, suitably rectangular peripheral angle or flanged collar or connecting member 9 having right angular related upper and outer flanges or legs 10 and 11, respectively, peripherally surrounds or encircles the sheets 7, preferably at a slight upward setback or offset from the joint 8, with its upper flange welded or otherwise fixed to its outer flange outstanding normal from the outer sides of the sheets. A second or lower suitably rectangular peripheral angle or flanged collar or connecting member 12 having right angularly related lower and outer flanges or legs 13 and 14, respectively, peripherally surrounds or encircles the walls 5 and 6 with its lower flange fixed to and outer flange outstanding normal from the walls and at an upward offset or set-out from the joint 8 equal to the set-back of the upper collar 9. With the collars 9 and 12 so constructed and their upper and lower flanges 10 and 13 laterally aligned or coplanar, the lower collar fits into or interfits with the upper and their outer flanges 11 and 14 are parallel and will abut or engage along their confronting faces when the walls 5 and 6 and sheets 7 about along the joint 8. The flanged connection or coupling so provided between the frame 3 and the hopper 1, while weldable for a permanent connection, particularly lends itself to a releasable connection, as by bolting the outer flanges 11 and 14 to each other, so that the apparatus as a whole can be attached and removed at will, with any leakage between the frame and the hopper when they are connected effectively prevented by the staggered joint provided by the offsetting of the collars relative to the joint 8.

The trough 4 in the frame 3 in effect forms a downward extension of the hopper 1 and, so long as there is lading in the hopper, necessarily will be filled with the lading. At least the side walls 5 of the trough 4 preferably are oblique and inclined or sloping and downwardly convergent for directing or leading any lading in the trough to a bottom discharge opening or outlet 15 preferably centered laterally on and extending the length of the trough between the end walls 6 and bounded at the sides by the laterally spaced lower ends, edges or extremities 16 of the side walls. For optimum performance of the apparatus, the ends 16 should be straight and parallel and the outlet 15 consequently rectangular. The outlet 15 is both an outlet for the trough 4 and an inlet for a mixing or air chamber 17 in a housing 18 forming the lower part of the frame 3. Suitably of U-shape with a flat horizontally extending bottom 19 and parallel vertical sides 20, the housing 18 is welded or otherwise fixed to and suspended or hung from or supported on the walls 5 and 6 of the trough 4 and is of a length and width and so positioned as to span, bracket, contain or enclose the inlet 15 to the mixing chamber 17 of which the portions of the side walls 5 laterally overlapped by the housing form the upward boundary.

For metering, regulating or controlling the gravity feed or flow of the suitable comminuted lading or material into the mixing chamber 17, there is swingably, pivotally or oscillatably mounted in the housing 18 a gate or valve 21 for opening and closing the inlet. The preferred gate 21 has as its closure element a sector-shaped or sectoral plate 22 set laterally on and extending longitudinally of and wider and either coterminous with or longer than the inlet 15. Reinforced at the sides by in- or down-turned side flanges 23, the closure or cover plate 22 preferably has straight and parallel sides 24 and presents for closing the inlet 15 an arcuately or cylindrically convex upper face 25 struck about its swinging axis. In closed position the closure plate 22 of the gate 21 is adapted to contact or engage the lower ends 16 of the side walls 5 forming the side boundaries of the inlet 15 and fit or be received in and project or extend into or through arcuately concave slots 26 in the end walls 6 and engage or contact the correspondingly arcuate bottom surfaces or edges 27 of the end walls upwardly bounding those slots.

For supporting the plate 22, the gate 21 has a plurality of longitudinally or axially spaced arms 28 which are centered laterally on and fixed to or rigid with and instand or downstand from the plate radially of its upper face 25. The gate 21 is mounted for swinging, oscillating, or pivoting vertically or laterally relative to the inlet 15 about a horizontal axis on a horizontally disposed support or bearing shaft or rod 29 below and centered laterally on the inlet 15 and extending longitudinally thereof and the housing 18, parallel to the lower ends 16 of the side walls 15 bounding or forming the inlet's sides. The preferred support rod 29 extends through and is rotatably received in the lower or inner ends of the radial arms 28 of the gate 21 and end or outer walls 30 of the housing 18 and is suitably rotatably mounted or journalled in those walls.

Were the swinging, oscillatory or rotary axis of the gate 21 fixed, it could not tightly or sealingly engage or be jammed against either of the sides or side boundaries 16 of the inlet 15 and, instead, would have to have sliding contact with or be spaced from the sides to permit the gate to oscillate, swing or turn relative thereto. With the sides 16 parallel and preferably either coradial with or tangential to the upper face 25 of the gate 21, tight engagement of the gate with both sides will seal the inlet and with either or both sides will lock the gate in a particular position. In the improved apparatus such sealing and locking is obtained without interfering with or deterring swinging or oscillation of the gate from one position to another. This is accomplished by making the gate's swinging, oscillatory or rotary axis shiftable or movable substantially radially or vertically toward and away from the inlet. Rather than accomplish this by mounting the support shaft 29 for vertical shifting in the end walls 30 of the housing 18, the desired shiftability of the gate's axis preferably is produced by making the shaft in the form of a crank having a plurality of longitudinally aligned crank arms or eccentrics 31 and rotatably mounting each of the radial arms 28 of one of the crank arms. Turnable by a handle 32 fixed to one or each of its ends beyond the housing 18, the support shaft or crank 29 on being turned will shift the rotary axis of the gate relative to the inlet. Two positions of the crank 29 ordinarily will be made use of, in both of which the crank arms 31 are centered on or aligned vertically with the crank's rotary axis as well as the inlet 15, one an upper or locking position in which the gate 21 is jammed or forced tight against one or each of the sides 16 of the inlet and the other in which the gate is spaced radially from one or both sides and free to swing or rotate. The gate 21 in its free or spaced position is turned or rotated conveniently by a second or turning crank or operating shaft or rod 33 rotatably mounted or journalled in the housing 18 and having a crank arm or eccentric 34 received in a radial slot in one or each of the radial support arms 28. As in the case of the locking shaft 29, the operating shaft 33 is horizontally disposed and preferably extends longitudinally through the housing 18 with a handle 36 fixed to each end for operation from either side of a car.

Using the locking and operating shafts 29 and 33, the gate 21, when spaced radially from the sides 16 of the inlet 15, can be swung between a closed position in which its sides 24 overlap both sides of the inlet and full or intermediate open positions in which one of its sides is within the inlet and spaced laterally or circumferentially from the side of the inlet it overlapped in closed position. In the illustrated embodiment there are two full open positions, one at either side of the center position, and swinging of the gate from either full open position to center or closed position will change or vary the preferably rectangular area of the inlet exposed or open for gravity feed or flow of comminuted material from the trough 4 into the mixing chamber 17 and, by producing a corresponding variation in the rate of feed, enable the feed rate to be metered, regulated or controlled to suit the particular lading.

Determination of the proper flow rate can be left to the operator at the point of discharge. However, it usually would be advantageous to preset the rate at the point of loading and this the improved apparatus makes feasible. For such presetting one or each of the handles 36 on the operating rod 33 is made adjustably limitable in the extent to which it and the rod can be turned in an opening direction from closed position. This is accomplished by forming on the outside of the frame 3 adjacent one or each end of the operating shaft 33 a suitably flat stop surface or abutment 37 facing and spaced from the shaft and on the opposite side thereof from and disposed normal to the related handle 36 in the latter's closed or normal position. A fixed stop lug 38, interrupting and disposed normal to the surface 37, projects therefrom toward the shaft 33 and is centered on the shaft and aligned with the handle when the latter is in its closed position.

Cooperating with the fixed top on the frame formed by the stop surface 37 and stop lug 38 is an adjustable stop member 39 mounted on the operating shaft 33 and having a pair of relatively movable jaws 40 at or embracing and engageable, opposite sides of the stop lug and each lockable or holdable against movement relative to the shaft in any of a plurality of positions for selectively varying or adjusting the gap between them. The preferred jaws 40 are a pair of interfoldable, generally sectoral blades or plates rotatably mounted abreast or in juxtaposition on the operating shaft 33 inside the adjoining handle 36 and each having on its inner side toward each end a generally radially extending jaw surface 41 and at each end an end surface or shoulder 42 so angularly disposed relative to the jaw surface as to engage the fixed stop surface 37 at one side of the stop lug at the same time that the jaw surface engages the corresponding side of the lug. Extending across each blade is a series of circumferentially spaced holes or apertures 43 equally spaced radially from the axis of the operating shaft 33 and each alignable with a hole or aperture 44 in the adjoining handle 36. A headed locking pin 45, chained to the handle and insertable throught the aligned holes therein and the blades and itself lockable in place, as by a cotter pin 46, enables the blades to be locked against movement to the handle in any of a plurality of positions with corresponding selective adjustment or variation in the gap between the jaw surface 41 presented for engagement with the stop lug 38.

Once the blades 40 are locked to the handle 36, the arc through which the handle can be swung on either side of its central, normal or locked position is fixed by the gap or included arc between the jaw surfaces 41 and the consequent imposition of this same limitation on the swing of the gate 21 out of closed position predetermines the area of the inlet 15 exposable or openable at either side of the gate for a flow of the comminuted lading into the mixing chamber 17. While the extent of interfolding or relative retraction and extension of the blades 40 predetermines the maximum access opening through the inlet 15 into the mixing chamber 17 for a given setting and requires the operator at the destination in an unloading operation simply to swing the handle toward one side or the other until it is stopped, the range of possible adjustment of the opening 15 is determined by the circumferential span of the blades and the number and arrangement of the holes 43 therein and the span and arrangement therefore should be selected to cover the range of openings required for the various comminuted ladings with which the car is likely to be loaded. Although the fixed and adjustable stops 37, 38 and 39 under certain circumstances might be used to lock the gate in closed position, as well to determine the maximum opening for a given setting, they are used only for the latter purpose in the illustrated embodiment.

If, as preferred, the locking and operating shafts 29 and 33, for external operation from either end of the apparatus by their respective handles 32 and 36, extend beyond opposite ends of the mixing chamber 17 and through openings 47 in the outer walls 30 of the housing 18 in which they are suitably journalled in sleeve bearings or bushings 48 fitted in the openings, the housing for the purpose desirably is canted or angled laterally or horizontally relative to the inlet 15. The air under positive or negative pressure with which the comminuted material fed by gravity through the inlet 15 is mixed for pneumatic discharge in the mixing chamber 17, flows longitudinally through the chamber and is introduced or admitted thereunto and exhausted or discharged therefrom through air ports 49 at opposite ends of the housing 18. Designed to serve interchangeably as air inlet and outlet ports, the preferred ports 49 are identical and conveniently formed by cylindrical sleeves or tube sections 50 extending longitudinally of the housing 18 and each adapted for external or internal coupling to an air hose or line (not shown). The air ports 49 being circular and the mixing chamber 17 generally rectangular in cross-section, the change or transition in section therebetween is made by transition castings, connections or couplings 51 welded or otherwise fixed to and rigid with the ends and forming end extensions of the housing 18. Internally progressively changing outwardly in cross-section from rectangular to circular and so contoured as to minimize turbulence in the air passing therethrough, the transition connections or members 51 are also progressively offset outwardly toward opposite sides of the housing for correspondingly offsetting the sleeves 50 and accommodating at opposite sides the handles 32 and 36 of the laterally centered locking and operating shafts 29 and 33. Each laterally or horizontally oblique, these opposite sides conveniently are the laterally sloping outer or end walls 48 of the housing through which the shafts 29 and 33 extend.

For closing or sealing the air ports 49 except during pneumatic discharge to prevent entry of foreign matter at other times each port has a cap or cover 52 fittable over the outer end of its sleeve 50. Suitably indented at the side adjacent its closed outer end 53 to provide radially instanding lugs 54 for positioning or centering it on the associated sleeve 50 and chained or otherwise connected against loss to the adjoining transition member 51, each cap 52 preferably is bell-mouthed to fit over a cylindrical boss 55 on the outer end of the transition member 51 in which the sleeve is received. A thrust gasket 56 about the sleeve engaged by an inwardly facing shoulder 57 formed in the cap and a peripheral O-ring about and seated in the boss inwardly of the gasket and engaged by the cap's mouth 59, quite effectively seal the related port 49 against entry of foreign matter when the cap is in place.

In the illustrated apparatus each cap, when slid over the sleeve 50 and boss 55 to close the adjoining port 49, is adapted to be both locked in place and forced or urged into engagement or contact with the thrust gasket 56 and O-ring 58 by a locking member 60 having an inner straight stem portion 61 sliding in and extending through a radial projection or protuberance 62 on the top of the transition member 51, and an outer looped handle portion 63 having an outer leg 64 serving as a handle and an inner leg 65 adapted to be swung to overlap and engage the outer end 53 of the adjoining cap 52. Ears 66 fixed centrally to and projecting outwardly from the cap's outer end are laterally spaced to seat or receive between them the inner leg 65 of the handle portion 63 and hold the handle portion against turning and these ears conveniently are apertured for application of the usual wire car seal (not shown) outwardly of the seated leg. A head 67 on the inner ends of the stem portion 61 so limits the extent of the movement of the locking member 60 as to prevent removal of the cap 52 except when the handle portion 63 is swung out of the way and a coil spring 68 encircling the stem portion inwardly of the projection 62 and acting therebetween and the head supplies through the handle portion 63 the inward pressure required for holding the cap tightly in place. If desired, a stop 69 may be provided on the stem portion outwardly of the projection 62 for limiting the extent of inward movement of the locking member 60 under the force of the return or pressure spring 68.

In the operation of the apparatus, the extent of opening of the inlet 15 by the gate 21 will usually be selected and preset at the point of loading to suit the particular lading by setting the adjustable stop member 39 on one or each of the handles 36 of the operating shaft 33 in the manner previously explained. In transit the gate 21 will of course be in closed position and jammed tight against or in sealing engagement with the boundaries of the inlet 15 by the action of the crank arms 31 on the locking shaft 29 and frictional resistance usually will suffice to hold that shaft and the operating shaft 33 against turning, with a car seal (not shown) between one or both of the locking handles 32 and the frame 3 serving to indicate any attempted tampering. At destination the seals will be broken and the locking members 60 swung out of the way. The removal of the caps 52 and coupling of a suction hose to one of the air ports 49 with the other left open or a pressure hose to one and a discharge hose to the other, should ordinarily precede operation of the gate 21 so that flow of air under pressure through the mixing chamber 17 can be started before the comminuted lading begins its gravity feed through the inlet 15. Once the air is applied, the locking shaft 29 will be turned by one of its handles 36 to release the gate 21 from its seat against the underside of the trough or chute 4 and the gate, then free, will be swung to the predetermined full open position by turning the operating shaft 33 by one of its handles 36, whereafter the gate will usually be locked or held in that position by again swinging the locking shaft 29 to locking position to jam the gate against the then overlapped side 16 of the inlet. The lading now feeding into the mixing chamber 17 at the predetermined suitable rate and mixing therein with the air flowing therethrough, the pneumatic discharge, so initiated, will continue until the lading in the associated hopper 1 has been completely discharged.

If a discharge operation is conducted in the foregoing manner and the rate of flow of the air through the mixing chamber 17 is suited for or compatible with the rate of feed of the cominuted material into the chamber, the improved apparatus will be self cleaning. However, due to improper use or an unsuitable condition of particular lading, a clogging condition conceivably may occur in the housing 18, the inlet 15 or even the trough 4 above the inlet. For just such a contingency, the central portion of the housing is made as an independently removable pan 70 removably attached to the underside of the trough 4, conveniently by being hinged at one side and bolted at the other, for dropping when unbolted to an out-of-the-way position. When the pan 70 is so dropped, the interior of the apparatus is readily accessible through the then open bottom 20 of the housing for clean-out or other maintenance and, if desired for any reason, the lading can even be discharged by gravity by opening both the bottom of the housing and the gate.

From the above detailed description it will be apparent that there has been provided an improved apparatus for pneumatically discharging cominuted lading from a railway car hopper which possesses numerous advantages over apparatus previously proposed. It should be understood that the described and disclosed embodiment is merely exemplary of the invention and that all modifications are intended to be included that do not depart from the spirit of the invention and the scope of the appended claims.

Having described our invention, we claim:

1. Apparatus for pneumatically discharging comminuted lading from a hopper comprising a housing attached to a bottom of the hopper and containing a mixing chamber ported for flow of air under pressure therethrough, said chamber having an inlet for feed of the comminuted lading thereinto from the hopper, a gate in said housing for swinging about an axis to open and close said inlet, and means connected to said housing for moving said gate in a direction different from a swinging direction thereof into and out of engagement with a boundary of said inlet respectively for restraining against and permitting said swinging thereof.

2. Apparatus according to claim 1, wherein the connected means is adapted to move the gate into and out of engagement with a boundary of the inlet by moving the swinging axis thereof.

3. Apparatus according to claim 1, wherein the connected means is adapted to move the gate into and out of engagement with a side of the inlet for locking the gate against swinging at any point within the range of swinging thereof.

4. Apparatus according to claim 3, wherein the connected means are crank shaft means rotatable in the housing and eccentrically mounting the gate for swinging between open and closed positions and for movement into and out of engagement with a boundary of the inlet.

5. Apparatus according to claim 4, including operating shaft means separate from the crank shaft means and operatively connected to the gate for singing the gate between open and closed positions.

6. Apparatus according to claim 5, including presettable means acting through the operating shaft means for selectively limiting the extent of opening of the gate to suit the particular lading in the hopper.

7. Apparatus according to claim 6, wherein the presettable means includes fixed stop means connected to one and adjustable stop means connected to the other of the housing and operating shaft means.

8. Apparatus according to claim 5 wherein the crank and operating shaft means each extends longitudinally through the mixing chamber and is operable from opposite ends of the apparatus.

9. Apparatus according to claim 1, including a frame of which the housing is a part, and means releasably attaching said frame to the hopper for enabling said apparatus as a unit to be attached to and removed from the hopper.

10. Apparatus according to claim 9, wherein the attaching means include flanged collars each encircling and having a flange fixed to one of the hoppers and frame adjacent joint therebetween, said fixed flanges are laterally aligned, each collar has a second flange outstanding at right angles from said fixed flange thereof and parallel to and abutting the second flange of the other collar, and said joint is offset from abutting faces of said second flanges in a direction normal thereto.

11. Apparatus according to claim 1, wherein the inlet and gate extend longitudinally of the mixing chamber and have substantially straight and parallel sides, the inlet and swinging axis of the gate are substantially centered laterally on the mixing chamber, and the gate has a cylindrically convex upper face wider than and alternately engageable with both and one of said sides of the inlet.

12. Apparatus according to claim 11, including a frame attached to the hopper above a bottom opening therein, the housing is a lower part of said frame, said frame has as an upper part a trough forming a downward extension of the hopper and downwardly terminating in and having sides sloping inwardly toward the inlet.

13. Apparatus according to claim 1, wherein the housing intermediate ends thereof has a bottom portion normally partly enclosing and removable for access to the mixing chamber.

14. Apparatus according to claim 13, wherein the removable bottom portion is hinged at one side and releasably attached at the other for swinging to an out of the way position.

15. Apparatus according to claim 1, wherein the housing is substantially rectangular in cross-section over the limits of the mixing chamber, and including air ports opening onto opposite ends and offset toward opposite sides of the mixing chamber.

16. Apparatus according to claim 15, wherein the ports are useable interchangeably as an inlet and an outlet for the mixing chamber, a removable cap normally closes each port, sealing means associated with each port are engageable by the cap thereof for sealing against entry of foreign matter, and spring-urged means connected to each port and swingable from a side over an end of the related cap is adapted to lock each cap in closed position in sealing engagement with the adjoining sealing means.

References Cited

UNITED STATES PATENTS

| | | | |
|---|---|---|---|
| 3,105,721 | 10/1963 | Collins et al. | 302—52 |
| 3,191,785 | 6/1965 | Price | 214—83.28 |
| 3,194,420 | 7/1965 | Kemp et al. | 214—83.28 |
| 3,199,925 | 8/1965 | Borger | 302—52 |
| 3,215,473 | 11/1965 | Kemp et al. | 302—52 |

ANDRES H. NIELSEN, *Primary Examiner.*